United States Patent [19]

Cole

[11] Patent Number: 4,931,902
[45] Date of Patent: Jun. 5, 1990

[54] BUSHBAR BARRIER PROTECTIVE MEMBERS

[75] Inventor: Anthony R. Cole, Swindon, United Kingdom

[73] Assignee: Square D Company, Palatine, Ill.

[21] Appl. No.: 297,902

[22] Filed: Jan. 17, 1989

[30] Foreign Application Priority Data

Jan. 14, 1988 [GB] United Kingdom ............... 8800851

[51] Int. Cl.⁵ .......................... H02B 1/06; H02B 1/14
[52] U.S. Cl. .................................. 361/354; 361/355; 361/361
[58] Field of Search ............... 361/361, 355, 354, 345

[56] References Cited

U.S. PATENT DOCUMENTS

4,472,761 9/1984 Koslosky ............................. 361/361
4,646,198 2/1987 Rich et al. ........................... 361/355

Primary Examiner—Roy N. Envall, Jr.
Attorney, Agent, or Firm—Richard T. Guttman; Jose W. Jimenez

[57] ABSTRACT

An electrical consumer unit comprises a moulded plastics baseplate (10) and a cover member (280), the baseplate (10) being adapted to mount a live busbar (24) and a neutral bar (90) to which a main, power-supply switch (196) and a plurality of circuit-breakers (212), for protecting a number of outgoing sub-circuits may be mounted. The unit is particularly intended for use with plug-in type switches and circuit breakers whereby a clip for mounting the switch also establishes electrical connection with the live busbar (24) and neutral bar (90). The present invention concerns a flexible plastic cover piece (252), adapted to clip onto the baseplate (10) in order to shield unused portions of the live busbar (24) against accidental contact.

6 Claims, 13 Drawing Sheets

BUSHBAR BARRIER PROTECTIVE MEMBERS

This invention relates to electrical consumer units and is principally, but not exclusively, concerned with consumer units for domestic use.

As is well known, a consumer unit comprises an enclosure containing a switch or circuit breaker (usually double-pole) for the incoming supply, a number of outgoing subcircuits each having its live side protected by a fuse or circuit breaker, and means interconnecting the live supply with the fuses or circuit breakers and interconnecting the neutrals and grounds.

It is known to provide the live interconnection by means of a busbar engaged by resilient clips on the incoming switch or circuit breaker and on miniature circuit breakers (mcb's) which provide the subcircuit protection.

Known consumer units suffer from a number of disadvantages.

One problem area relates to the enclosure itself. This is conventionally provided in the form of a box and cover formed from folded sheet metal, usually mild steel. The box has a planar base which is secured to a wall to leave four sides projecting from the wall. The electrical parts are mounted, via insulators where necessary, to the base. During installation the electrician must feed cables into the box and make the required connections within it. This can be a difficult operation, and while carrying it out it is easy to impose undue stress or over-tight bends on the cables. Such enclosures are of poor aesthetic appearance, since the possible shapes are limited, and sheet edges and joins are visible. Moreover, consumer units of this type are expensive to manufacture as they require a relatively large number of parts and of assembly operations which are difficult to mechanise.

Frequently, a consumer unit is installed which serves fewer subcircuits than are provided for; for example, a six way unit may serve only four subcircuits, thus leaving two portions of the live busbar bare. It is known to shroud such portions with insulating material, but shrouds hitherto in use are cumbersome and are difficult to position and remove when the consumer unit is fully assembled.

Plug-on busbar units of the type described above are suitable for receiving only mcb's. An alternative conventional approach is to mount fuse carriers and/or mcb's on a mounting rail which does not carry current, the interconnections being made via cables or busbars. The DIN rail system is commonly used for this purpose. In recent years there has been a trend to use the DIN rail to additionally mount accessories such as timers and sensor controllers. It has not hitherto been possible to make use of DIN-mounting accessories and plug-on mcb's in the same consumer unit.

Accordingly, it is an object of the present invention (which invention is defined in the appended claims) to overcome or mitigate at least one of the foregoing problems.

Embodiments of the invention will now be described, by way of example only, with reference to the accompanying drawings, in which.

Figure 40:
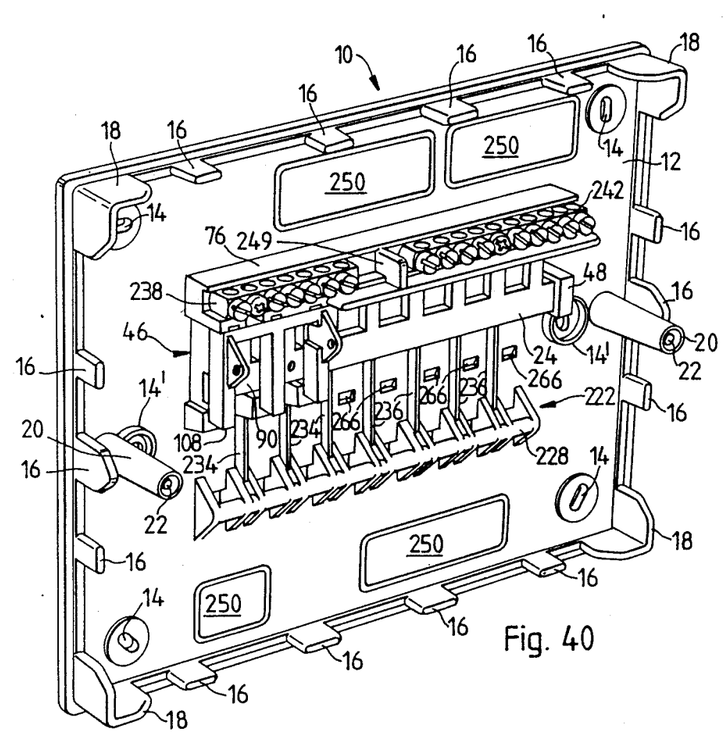
FIG. 40 is a perspective view of the baseplate FIG. 1 having a busbar, neutral bar, retaining clip and terminal strips (as shown in FIGS. 13, 14, 17, 18, 19, 24 and 25) mounted thereon.

Referring firstly to FIGS. 1 to 4 FIGS. 40 to 42 of the drawings, a baseplate, generally designated 10, of a circuit breaker box comprises a substantially planar, rectangular base 12 formed from plastics insulating material and having various formations moulded in the centre of the surface thereof whereby a busbar 24 (FIGS. 13A and B), a neutral box 90 (FIGS. 14A and B), a plurality of circuit breakers 196, 212 (FIGS. 15A, B and C, FIGS. 16A, B and C), terminal strips 238, 242 (FIGS. 24A, B and 25A, B) etc may be mounted on the baseplate 10. These features are described in more detail below. The base 12 further includes a plurality of apertures 14 located at each corner thereof whereby it may be affixed to a wall (not shown) or the like by means of screws (not shown) or other suitable fixing means, a plurality of locating lugs 16, 18 disposed around its periphery for locating a cover member (FIGS. 26 to 30) and first and second cover-fixing posts 20 located adjacent either lateral edge of the base 12. FIG. 40 shows additional fixing appatures 14' located adjacent the posts 20. The lugs 16, 18 and posts 20 are also moulded integrally with the base 12 and the posts 20 are each provided with a bore 22 (see also FIGS. 6 and 8) extending downwardly from their topmost surfaces 24 to receive a screw or the like (not shown) for fixing the cover member to the baseplate 10.

Figure 13A:
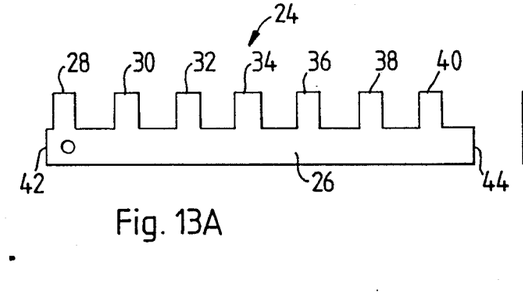
FIGS. 13A and 13B are, respectively, plan and end views of a live busbar embodying part of the invention.
Figure 13B:
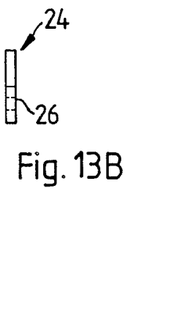

FIGS. 13A and 13B show a metal busbar 24 (preferably copper) comprising an elongate strip 26 having a plurality of tongue portions 28, 30, 32, 32, 34, 36, 38, 40 spaced along and extending outwardly from one lateral edge thereof, the first tongue 28 being spaced slightly from a first end 42 of the strip 26 and the last tongue 40 being spaced from the opposite end 44 of the strip by a relatively greater distance.

In use, the busbar 24 is supported, spaced from the base 12, at either of its ends 42 and 44 by first and second raised mouldings 46 and 48 respectively. The first of these mouldings 46 includes a ledge 50 (see also FIG. 7), recessed from the adjacent portions of the moulding 46, slightly wider than the strip 26 of the busbar 24, and an extension 52 which projects at right angles from one side 54 of the ledge 50 (towards an "upper" edge 56 of the base 12). The second moulding 48 comprises a generally rectangular box 58, open at its bottom 60 and closed at its top 62 (see also FIGS. 6 and 8). One wall 64 of the box 58 which faces the center of the board 12 and the first moulding 46, defines a shoulder 66, and a slot 68 adjacent the shoulder 66 and extending across the width thereof which communicates with the interior of the box 58. In use, the second end 44 of the busbar 24 is inserted into the slot 68 and rests upon the shoulder 66, and the first end rests upon the ledge 50. The tongue 28 of the busbar 24 is supported by the extension 52 projecting from the ledge 50. The busbar 24 thus extends transversely of the base 12 with the tongues 28 to 40 projecting towards the top edge 56.

A further raised moulding 70 located adjacent the moulding 46 also includes a ledge 72 (see also FIG. 8) and an extension 74, of the same heights and widths as the ledge 50 and extension 54, the extensions 54 and 74 being parallel to one another The extension 74, however, extends to meet a moulded rail 76 which extends transversely of the base 12 (ie parallel to the busbar 24 when in position) between the mouldings 46, 48, 70 and the edge 56.

Figure 5:
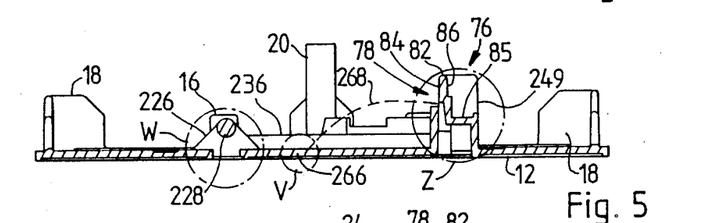
FIG. 5 is a section on line A—A of FIG. 1.
Figure 6:
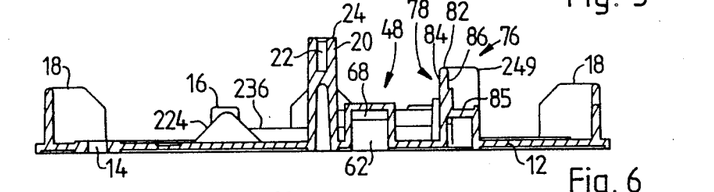
FIG. 6 is a section on line B—B of FIG. 1.
Figure 7:
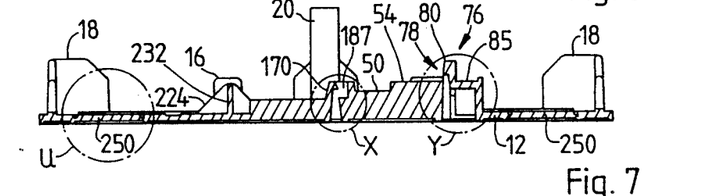
FIG. 7 is a section on line C—C of FIG. 1.
Figure 10:
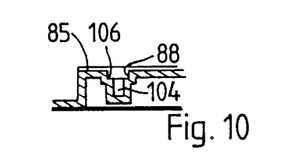
FIG. 10 is a section on line F—F of FIG. 1.
Figure 11:
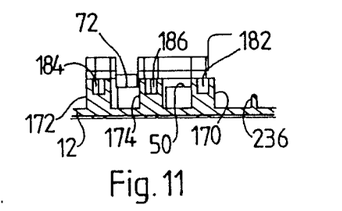
FIG. 11 is a section on line G—G of FIG. 1.
Figure 12:
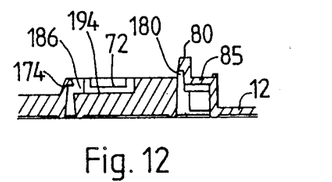
FIG. 12 is a section on line H—H of FIG. 1.

As is best seen in FIGS. 5, 6 and 7, the rail 76 comprises a wall 78, having a relatively low portion 80 and a relatively high portion 82, (the portion 82 having a "front" face 84 which faces the tongues 28 to 40 of the busbar 24 when in position), and a shoulder 85 extending along the "rear" face 86 of the wall 78. A notch 88 (FIG. 10) is formed in the portion 80 of the wall 78 and the surface of the shoulder 84 opposite the extension 74 of the ledge 72. The purpose of this and other features of the rail 76 is explained below.

Figure 14A:
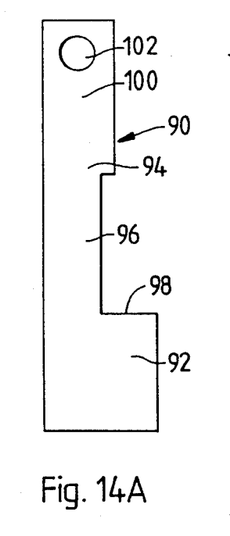
FIGS. 14A and 14B are, respectively, plan and end views of a neutral bar embodying part of the invention.
Figures 14B, 23A:
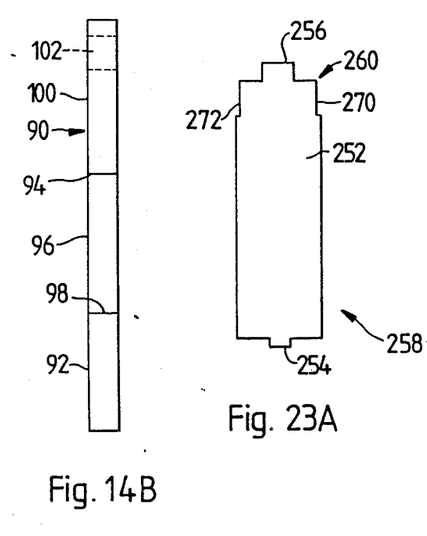
FIGS. 23A and 23B are, respectively, plan and side views of a barrier clip embodying part of the invention.

The ledge 72 and extension 74 support a neutral bar 90 which, as shown in FIGS. 14A and 14B, comprises a short strip 92, of the same width as the strip 26 of the busbar 24, and a tongue 94. The tongue 94 comprises a first portion 96 extending from an edge 98 of the strip 92, and of the same width as the tongues 28 to 40 of the busbar 24, and a relatively wider end portion 100 having an aperture 102 formed therein. In use, the strip 92 rests on the ledge 72, the first tongue portion 96 is supported by the extension 74 and the end tongue portion 100 extends into the notch 88, the aperture 102 being aligned with a bore 104 extending downwardly from the floor 106 of the notch 88 (see FIG. 10).

The busbar 24 and neutral bar 90 are retained in place on the base 12 by means of a clip 108, preferably of plastics material, as illustrated in FIGS. 17 to 22. The clip 108 comprises an elongate member 110 having first, second and third arms 112, 114 and 116 extending outwardly at right angles from either end and from the middle thereof respectively. Each of the arms 112, 114 and 116 has a tooth 118 projecting downwardly from its outer end, each tooth being split transversely by a slot 120 and having a barb 122 formed at the bottom of its outermost face 124. The second and third arms 114 and 116 are each additionally provided with a barrier portion 126 extending along one side (the right hand side in FIG. 21) of the lower surface 128 thereof. The barrier portions 126 are approximately half the width of the arms 114 and 116 and of the same depth as the teeth 118, and extend from the inner faces of the teeth 118 partway along the arms 114 and 116 towards the elongate member 110.

Figure 18:
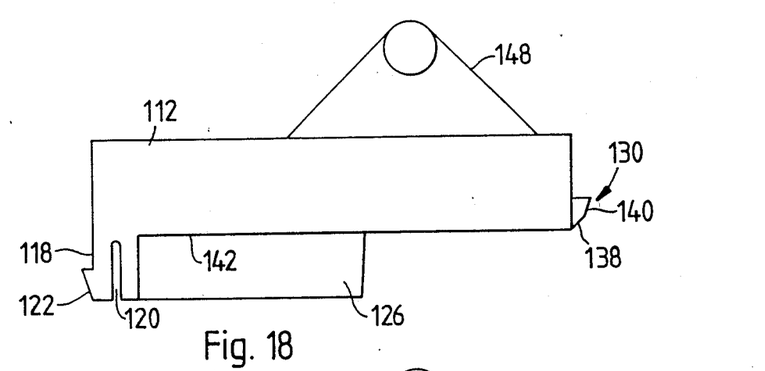
Figure 19:
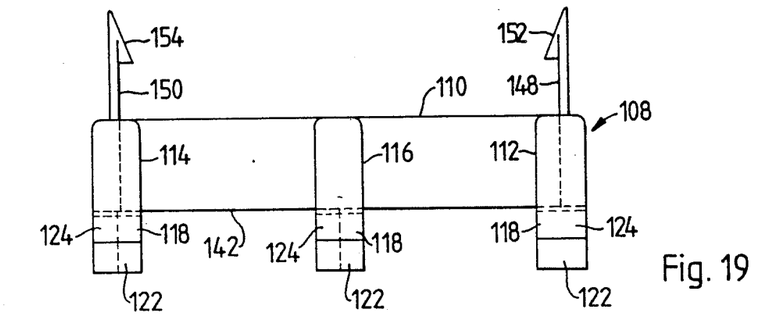
Figure 20:
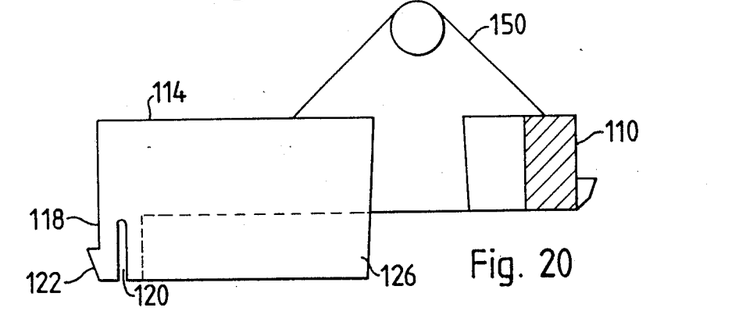
FIG. 20 is a section on line A'—A' of FIG. 17.
Figure 21:
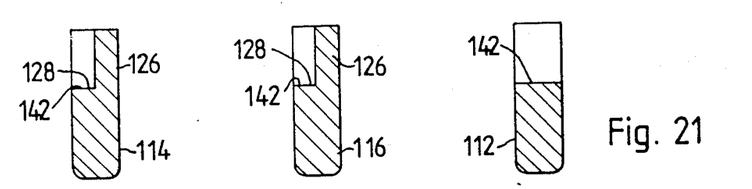
FIG. 21 is a section on line B'—B' of FIG. 17.

The clip 108 is further provided with first, second and third projections 130, 132, and 134 formed on a face 136 of the elongate member 110 opposite that from which the arms 112, 114 and 116 project. As is best seen in FIGS. 18 and 20, each of the projections 130, 132, 134 comprises a first face 138 extending "upwardly" from the bottom edge of the face 136 at a first angle (typically 45° to the horizontal as illustrated) and a second face 140 extending from the end of the first face 138 at a second angle (typically 70° to the horizontal). Small conical pips 142 (shown greatly enlarged in FIG. 22) are also formed on the underside 144 of the elongate member 110, midway between the arms 114 and 116, and on the undersides 146, 128 of the arms 112, 114, 116, adjacent the barrier portions 126 of arms 114 and 116 and in a corresponding position on arm 112. Finally, the clip 108 is provided with a pair of triangular lugs 148, 150 extending upwardly from the outer arms 112, 114, each of said lugs 148, 150 being provided with a projection 152, 154 on its inner face 156, 158 at the apex thereof. The projections 152, 154 are in the form of circular wedges thickening in a downward direction.

As mentioned above, the clip 108 serves to retain the busbar 24 and neutral bar 90 in position on the base 12 and, as is best seen in FIG. 1 and FIGS. 7 to 11, suitable formations are moulded in the surface thereof around the ledges 50 and 72 to receive the clip 108. These formations comprise a shoulder 160 extending along the front face 162 of the portion 80 of the wall 78 and first, second and third arms 164, 166, 168 extending at right angles from either end and from the middle of the shoulder 160 respectively, the spacing of the arms corresponding to the spacing of the arms 112, 114, 116 of the clip 108. The arms 164, 166, 168 extend beyond the ledges 50 and 72 and terminate with block portions 170, 172, 174. The upper surfaces of the shoulder 160, the arms 164, 166, 168 and the block portions 170, 172, 174 are raised above the level of the ledges 50 and 72 by a distance corresponding approximately to the thickness of the busbar 24 and the neutral bar 90.

Figure 7A:
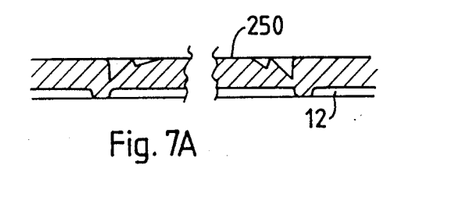
FIGS. 7A, 7B and 7C are enlarged fragmentary views of details U, X and Y respectively of FIG. 7.
Figure 7B:
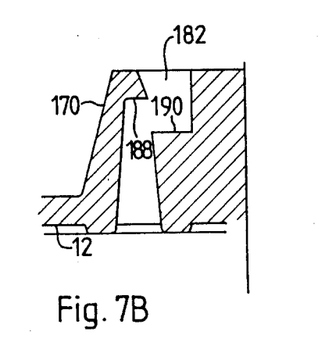
Figure 7C:
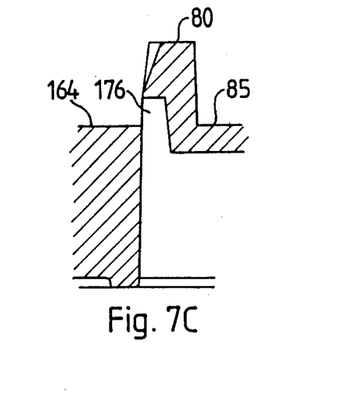

As is best seen in FIGS. 7B and 7C, first, second and third slots, 176, 178, 180 are formed in the face 162 of the wall portion 80 immediately above the shoulder 160, and first, second and third downwardly extending apertures 182, 184, 186 are formed in the block portions 170, 172, 174. In use, the slots 176, 178, 180 receive the projections 130, 132, 134 of the clip 108 and the apertures 182, 184, 186 receive the teeth 118. Each of the apertures 182, 184, 186 includes an inwardly extending lip 188 and a shoulder 190 (see FIG. 7B). Upon insertion of the teeth 118 into the apertures 182, 184, 186, the barbs 122 of the teeth 118 engage under the lips 188 and retain the clip 108 in place so that it may not be removed without considerable difficulty.

It will be noted that the arms 164, 168 which extend adjacent the ledges 50 and 72 are cut away along part of their length to accommodate the busbar 24 and neutral bar 90. The other arm 166 is cut away in a similar manner. This is not strictly necessary in the embodiment of FIG. 1, however, as will be described later, it is useful in other applications for which the same or a similar moulding is employed. The arms 168 and 166 and block portions 174 and 172 further include cut-outs 192 and 194 to accommodate the barrier portions 126 formed on the arms 114 and 116 of the clip 108.

When the busbar 24, neutral bar 90 and clip 108 are installed on the base 12, then, the arms 112 and 116 extend across the busbar 24 and neutral bar 90 to retain them in position. The conical pips 142 of the clip 108 bear upon the surfaces of the busbar 24 and neutral bar 90 to restrict their movement when clamped in place, whilst the barrier portion 126 of arm 116 serves to isolate the neutral bar 90 from the busbar 24.

Figure 1:
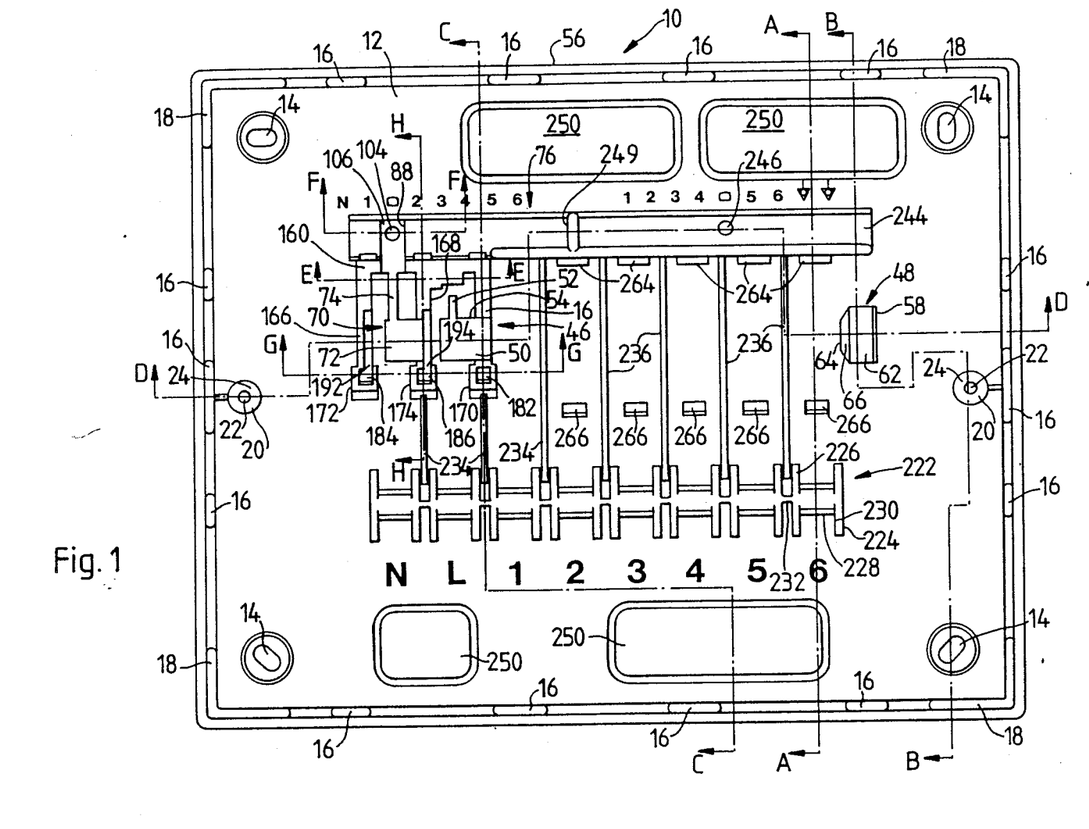
FIG. 1 is a plan view of the baseplate of a consumer unit embodying the invention.
Figure 2:
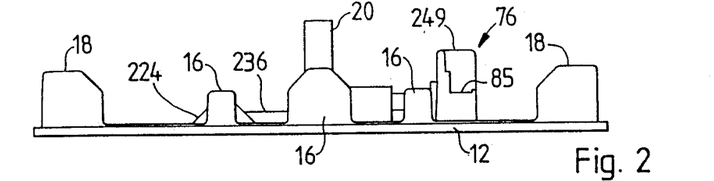
FIGS. 2, 3 and 4 are, respectively, end, front and rear views of the baseplate of FIG. 1.
Figure 3:
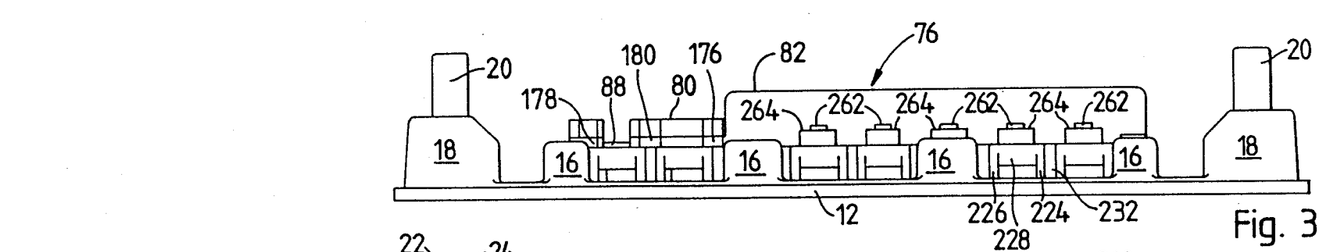
Figure 4:
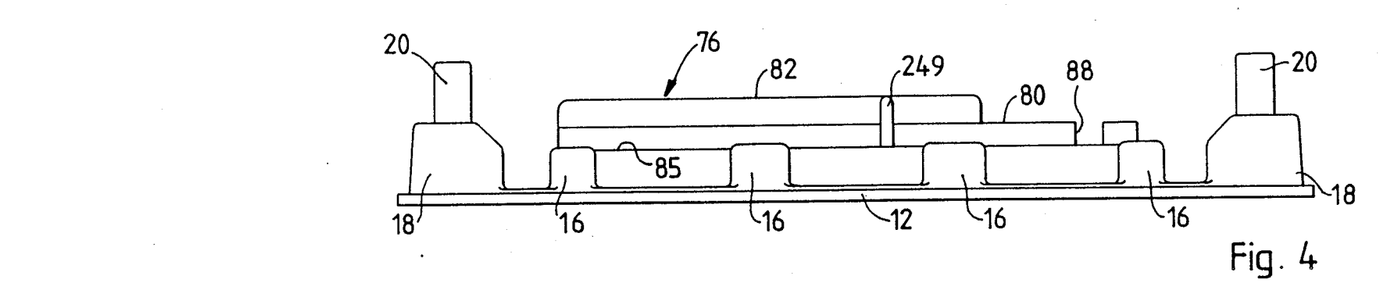
Figures 15A, 15B, 15C:
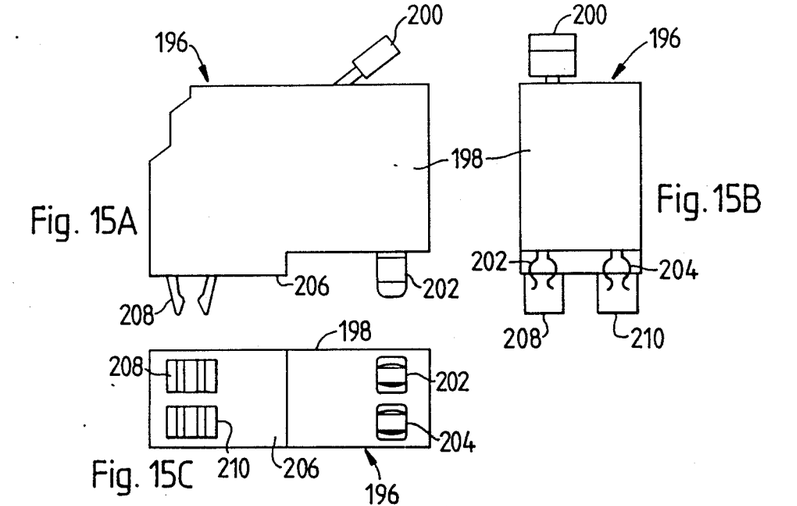
FIGS. 15A, 15B and 15C are, respectively, side, end and bottom views of a double-pole switch with which the invention may be used.
Figure 16A:
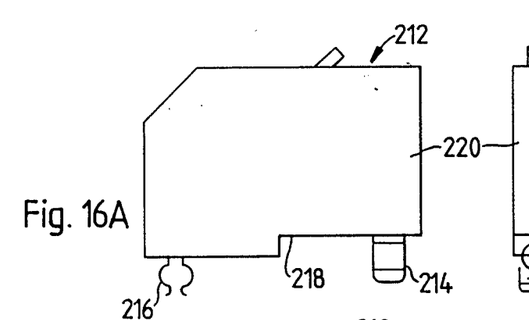
FIGS. 16A, 16B and 16C are, respectively, side, end and bottom views of a single-pole circuit breaker with which the invention may be used.
Figure 16B:
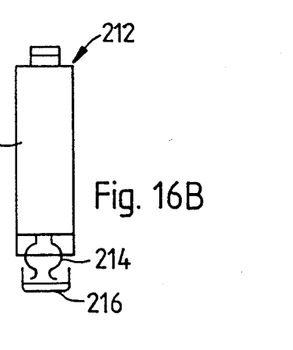
Figure 16C:
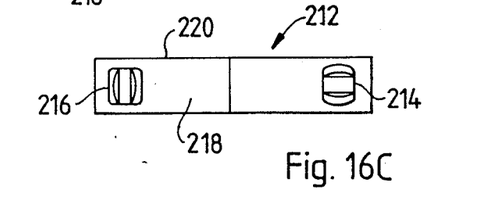
Figures 17, 22:
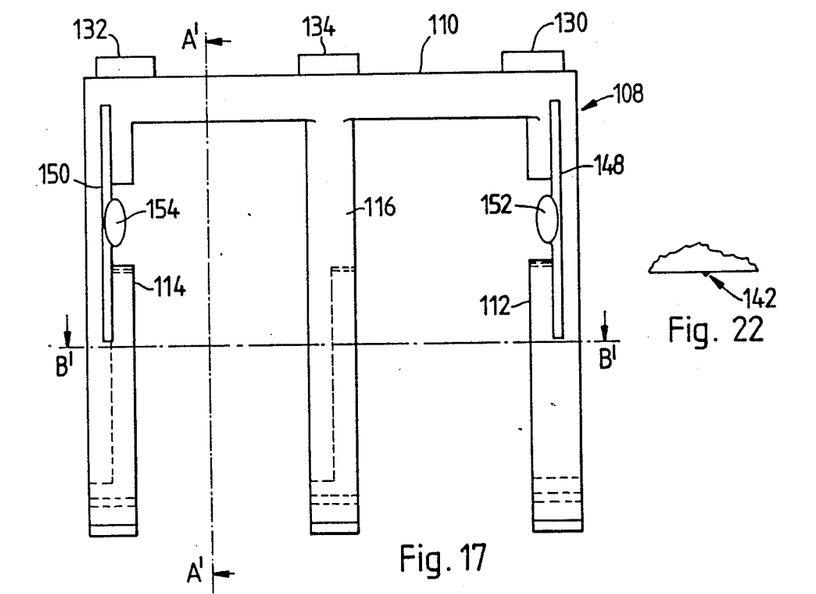
FIGS. 17, 18 and 19 are, respectively, plan, side and front views of a busbar retaining clip embodying part of the invention.
FIG. 22 is a greatly enlarged view of a conical pip formed on certain surfaces of the clip of FIGS. 17, 18 and 19.
Figures 40A, 42:
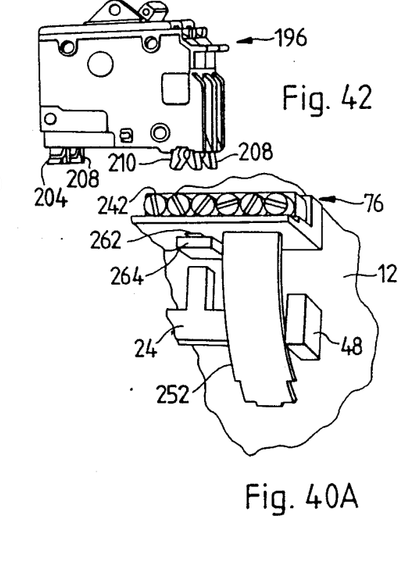
FIG. 40a is an enlarged fragmentary view of a portion of the baseplate of FIG. 40, illustrating the location of the barrier clip illustrated in FIGS. 23a and 23b.
FIG. 42 is a perspective view of the double pole switch of FIGS. 15a, 15b and 15c.
Figure 41:
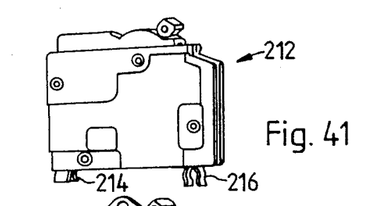
FIG. 41 is a perspective view of the single pole circuit breaker of FIGS. 16a, 16b, and 16c.

The baseplate 12 is particularly intended for use with plug-in type circuit breakers of the type illustrated in FIGS. 15A, B and C and FIGS. 16A, B and C and FIGS. 41 and 42. FIGS. 15A, B and C show a double-pole switch 196 comprising two ganged switches (not shown) in a common casing 198 and operable by a common actuating member 200. The casing 198 is provided with first and second C-clips 202, 204 adjacent one end of its bottom surface 206 and third and fourth C-clips 208, 210 adjacent the opposite end thereof. The limbs of the first and second C-clips 202, 204 are spaced transversely relative to the surface 206 whilst the limbs of the third and fourth C-clips 208, 210 are spaced longitudinally relative thereto; that is, the third and fourth C-clips 208, 210 are oriented at right angles to the first and second C-clips 202, 204. FIGS. 16A, B and C and FIG. 41 show a single pole circuit breaker 212 having first and second C-clips 214, 216 located at either end of the bottom surface 218 of its casing 220, again oriented at right angles to one another. The baseplate 10 of FIG. 1 is designed to accommodate a double-pole switch such as 196, the first and second C-clip 202, 204 whereof are metallic and constitute neutral and live terminals respectively, and up to six single pole circuit breakers such as 212, the first C-clip 214 whereof is also metallic and constitutes its live input terminal.

In use, the first C-clip 202 of the double-pole switch 196 engages the first tongue portion 96 of the neutral bar 90, and its second C-clip 204 engages the first tongue 28 of the busbar 24, simultaneously affixing the circuit breaker 196 thereto and establishing electrical connection. When the double pole switch 196 is installed, the projections 152, 154 of the lugs 148, 150 of the clip 108 engage apertures (not shown) on the side faces of the switch 202. These aperatures are a standard rivet position on the Square D Company's range of switches with which the baseplate 10 is intended to be used. The first C-clip 214 of each of the single pole circuit beakers 212 may be attached to one of the remaining tongues 30 to 40 of the busbar 24 in a similar manner.

The third and fourth C-clips 208, 210 of the two pole circuit breaker 196 and the second C-clips 216 of the single pole circuit breakers 212, which do not act as terminals of the circuit breakers 196 and 212 and may be made from plastics material, are attached to the base 12 by means of a row of raised bosses 222 spaced from and extending parallel to the rail 76 at positions opposite the positions of the various tongues 96 and 28 to 30 of the neutral bar 90 and the bushbar 24.

Figure 5A:
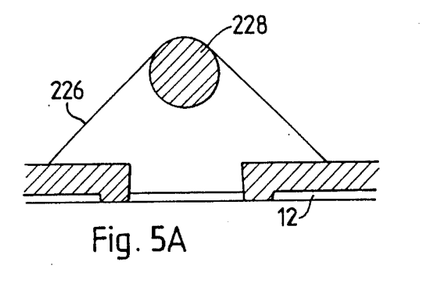
FIGS. 5A, 5B and 5C are, enlarged fragmentary views of details W, V and Z respectively of FIG. 5.

Each of the bosses 222 comprises a pair of upstanding, parallel, spaced, triangular lugs 224 and 226 having their apices interconnected by a solid, circular section member 228 (FIGS. 5 and 5A) to which the appropriate C-clips 208, 210 and 216 may be attached. The angles and dimensions of the lugs 224 and 226 are selected to allow the circuit breakers 196, 212 to be levered off against the edges 230 of the lugs 224 and 226 remote fromm the rail 76 when it is necessary to remove them. This helps to reduce the stress placed on the base 12 during such removal.

Adjacent lugs 224 and 226 of adjacent bosses 222 are joined by webs 232, and the base is further strengthened by a series of parallel ribs 234 and 236 extending, respectively, between the block portions 170, 174 and the bosses 222 and between the portion 82 of the wall 78 and the bosses 222.

Figure 24A:
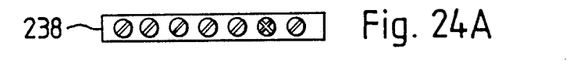
FIGS. 24A and 24B are, respectively, top and side views of a neutral terminal strip embodying part of the invention.
Figure 24B:
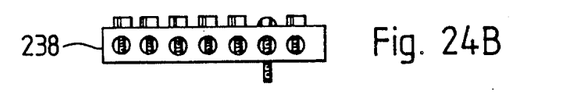
Figure 25A:
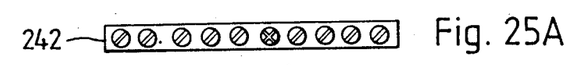
FIGS. 25A and 25B are, respectively, top and side views of an earth terminal strip embodying part of the invention.
Figure 25B:
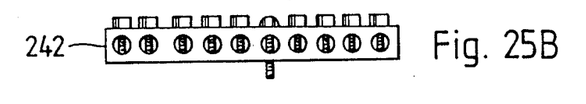
Figure 26:
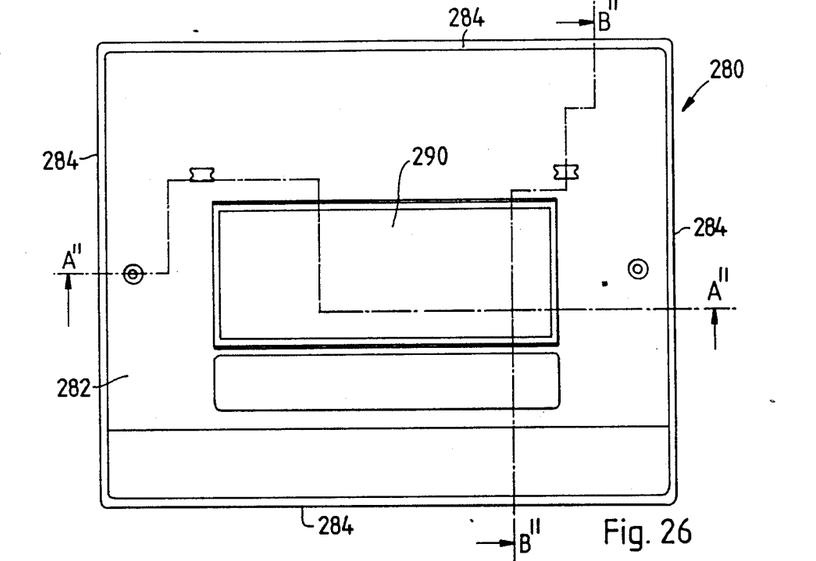
FIGS. 26, 27 and 28 are, respectively, plan, end and top views of a cover member of a consumer unit embodying the invention.
Figures 27, 30:
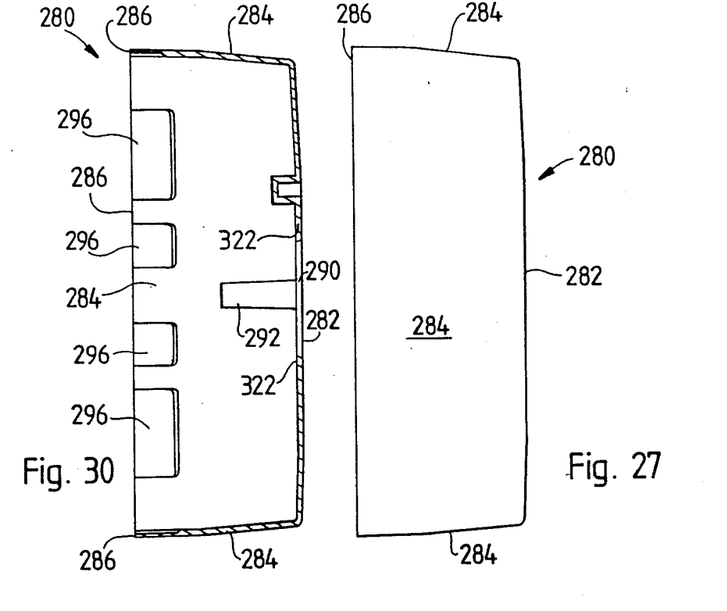
FIG. 30 is a section on line B"—B" of FIG. 26.

The double-pole switch 196, when installed on the base 12, serves as a main input supply switch through which power is fed to the busbar 24. Single pole circuit breakers 212 of appropriate current ratings, which are also connected to the busbar 24, may then feed up to six branch circuits. The neutral lines of the branch circuits may be connected to a first terminal strip 238 (such as is shown in FIGS. 24A and B) which, in use, is mounted on the shoulder 85 of the rail 76 adjacent the left hand end 24 (as seen in FIG. 1) thereof. The first terminal strip 238 is fixed in place by means of a screw (not shown) extending therethrough and entering the aperture 102 of the neutral bar 90 and the bore 104 formed in the floor 106 of the notch 88. The strip 238 is thus electrically connected to the neutral bar 90 and hence to the neutral pole of the double-pole switch 196. The necessary earth connections may be made via a second terminal strip 242 (such as is shown in FIGS. 25A and B) mounted towards the opposite end 244 of the shoulder 85 of rail 76 by means of a further screw (not shown) and a second bore 246 formed in the floor 248 of the shoulder 85. The neutral and earth terminal strips 238 and 242, when installed, are electrically isolated from one another by a barrier portion 249 extending from the rear of the wall 82 across the width of the shoulder 85.

Partially cut out rectangular knock-out portions 250 (see, for example, FIG. 7A) are also formed at appropriate positions on the base 12 which may be removed as required to allow wiring (not shown) to pass through the base 12 for connection to the various terminals.

Figure 5B:
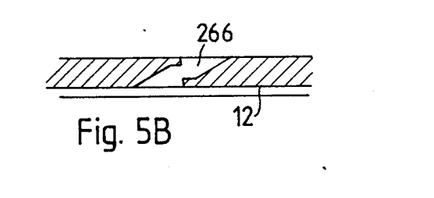
Figure 5C:
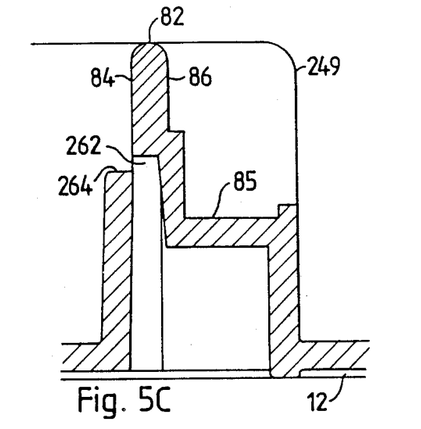
Figure 23B:
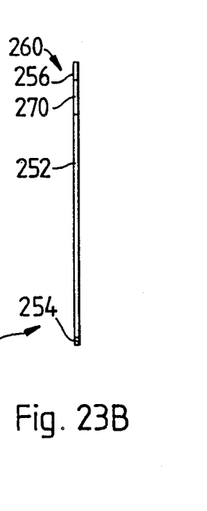

If less than six branch circuits are to be supplied (ie. if less than six single pole circuit breakers 212 are installed), then the exposed portions of the busbar 24 may be shielded against accidental contact by means of barrier clips 252 (see FIGS. 23A and 23B) formed from flexible, plastics, insulating material. The barrier clips 252 each suitably comprise a strip of relatively thin plastics material, of width substantially equal to the width of the single pole circuit breaker 212, and having first and second tongue portions 254 and 256 formed at either end 258,260 thereof. The base 12 is adapted to receive the clips 252 by the provision of a first series of slots 262 and shoulders 264 on the front face 84 of the wall portion 82 of the rail 76, at positions opposite the positions of the tongues 32 to 40 of the busbar 24 (when installed), and a second series of slots 266 formed in the base 12 intermediate the position of the busbar 24 (when installed) and the bosses 222, directly opposite the first slots 262. The slots 262 and 266 and the shoulders 264 are shown in section in FIGS. 5, 5B and 5C. As is best seen in FIG. 5B, the second slots 266 extend generally diagonally through the base 12, being inclined downwardly away from the rail 76.

The barrier clip 252 is installed on the base 12 by inserting the first and second tongue portions 254, 256 into corresponding first and second slots 262 and 266 such that the barrier clip 252 assumes an arcuate configuration curving over the corresponding portion of the busbar 24 (when installed) as shown by the dotted line 268 of FIG. 5. The barrier clip 252 thus shields a portion of the busbar 24 corresponding to the width of one single pole circuit breaker 212. Cut away portions 270 and 272 are formed adjacent the second end 260 of the barrier clip 252 to allow it to enter between a pair of ribs 236. It will be noted also that the slots 262 and 266 and the shoulder 264 are omitted from the part of the base 12 corresponding to the position of the second tongue 30 of the busbar 24 since it is assumed that at least one single pole circuit breaker 212 will always be installed.

Figure 8:
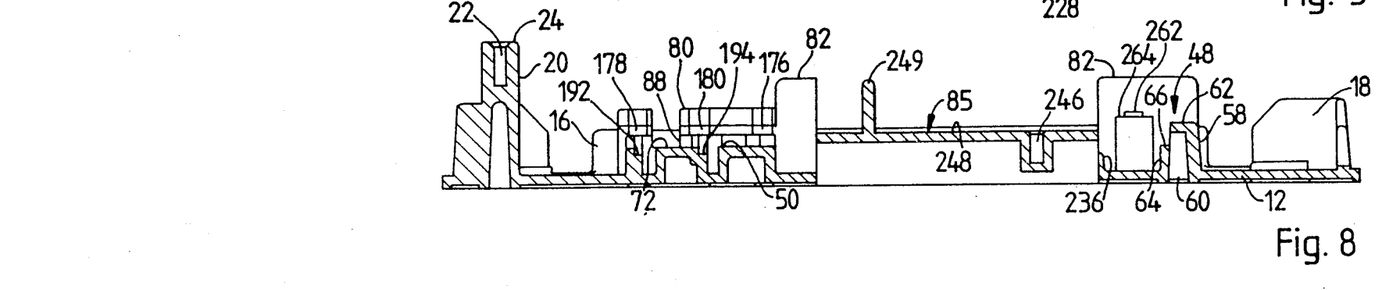
FIG. 8 is a section on line D—D of FIG. 1.
Figure 9:
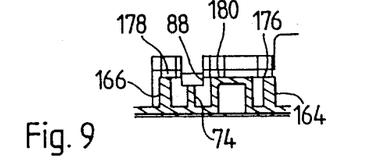
FIG. 9 is a section on line E—E of FIG. 1.
Figures 28, 29:
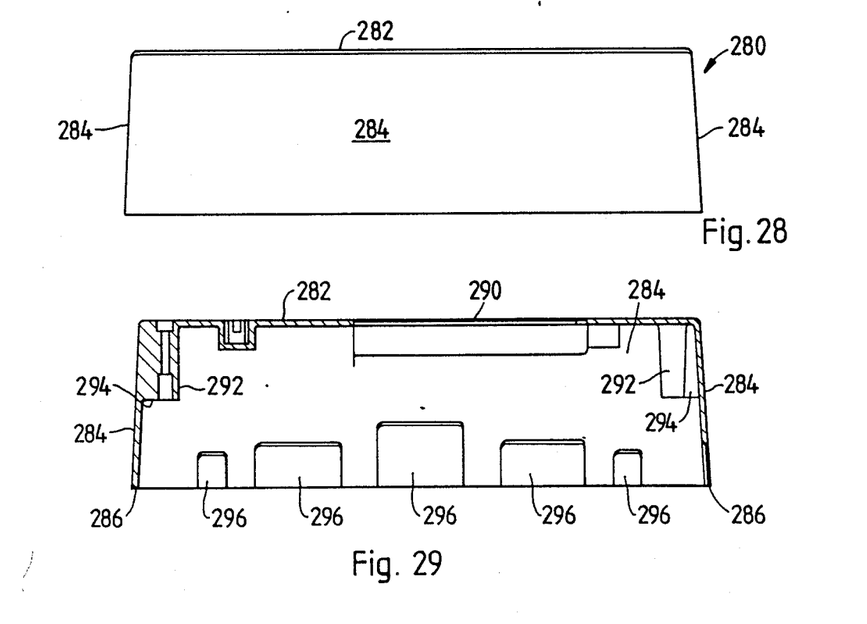
FIG. 29 is a section on line A"—A" of FIG. 26.

Referring to FIGS. 26-30, the cover member generally designated at 280 comprises a top surface 282 and side walls 284 providing a generally box shape. In use the free edges 286 of the side walls seat against the base 12 and are located by the lugs 16, 18 and a peripheral rib therebetween. The top surface 282 has a rectangular opening 290 dimensioned to receive the upper parts of the circuit breakers mounted in the unit, as is well known per se. As best seen in FIG. 29, bosses 292 (jointed to the side wall 284 by webs 294) are formed integrally and provide bores for fastening screws (not shown) engaged in the bores 22 of the base member bosses 20 (FIG. 8).

Each side wall 284 is provided with a plurality of knock-out portions 296 formed by zones of reduced thickness. The disposition is such that each knock-out portion 296 is between a pair of the base lugs 16, 18 when the unit is assembled. The dimensions of the knock-out portions 296 are chosen to receive standard trunking sizes. It will be seen that, in this embodiment, the knock-out portions 296 extend to the free edge of the side wall 284.

Thus, the present consumer unit has a generally planar base member and a generally box-shaped cover.

When making an installation, the base member is secured in position (having first removed the appropriate knock-out(s) 250 if rear cable entry is to be used). It is then possible to locate circuit breakers, install the required cabling, and generally complete the installation without being hindered by side walls of the enclosure. Once this is complete, the cover can be positioned, having first removed the appropriate knock-out(s) 296 for side cable entries, as a final step.

Turning to FIGS. 32 to 37, there will now be described an adaptor, generally designated 300, for use with the foregoing base and cover. The purpose of the adaptor 300 is to provide a means of securing a mounting rail within the consumer unit. the mounting rail may for example be to the Deutsche Industriale Normalien (DIN) standard, and will be referred to simply as a DIN rail. Standard components for mounting on a DIN rail are not designed for engaging a busbar, and have dimensions different to the Square D Company plug-on miniature circuit breakers for which the embodiment already described is particularly intended.

Figures 35, 36, 37:
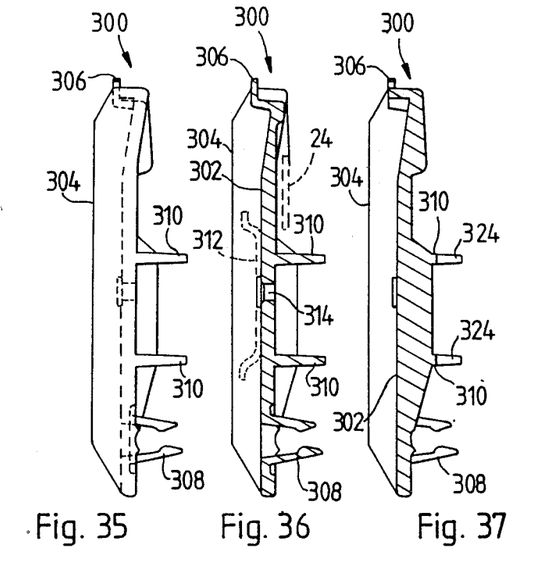
FIG. 36 is a section on line A'''—A''' of FIG. 32.
FIG. 37 is a section on line B'''—B''' of FIG. 32.

The adaptor 300 is an integral plastics moulding having a planar body 302 and end walls 304. A plurality of lugs 306 project from one side; these are spaced and dimensioned to be engageable in the slots 262. A corresponding number of resilient clip portions 308 project the underside of the body 302 to be engageable on the bosses 222. The adaptor 300 can thus be removably mounted to the base. In this condition, as indicated in broken line in FIG. 36, the busbar 24 sits under the body 302, and the adaptor 300 is braced against the surface of the base 12 by projecting parallel, transverse ribs 310. The ribs 310 extend across the width of the body 302 and are provided with notches 324 to accommodate the ribs 236 of the base 12. FIG. 36 also shows in broken lines a DIN rail 312 which is secured to the adaptor 300 by fasteners (not shown) engaged in bores 314. The DIN rail 312 is located on the adaptor 300 by slots (not shown) in the DIN rail engaging projections 316 on the surface of the adaptor.

The adaptor 300 shown in the drawings is dimensioned to fit over six ways of a consumer unit. It will be understood that this size of adaptor would normally be used with a larger consumer unit, eg a 10-way unit, so that the eventual installation would comprise a number of sub-circuit miniature circuit breakers mounted on the busbar, the adaptor, and a number of accessories mounted on the adaptor DIN rail.

Figures 38, 39:
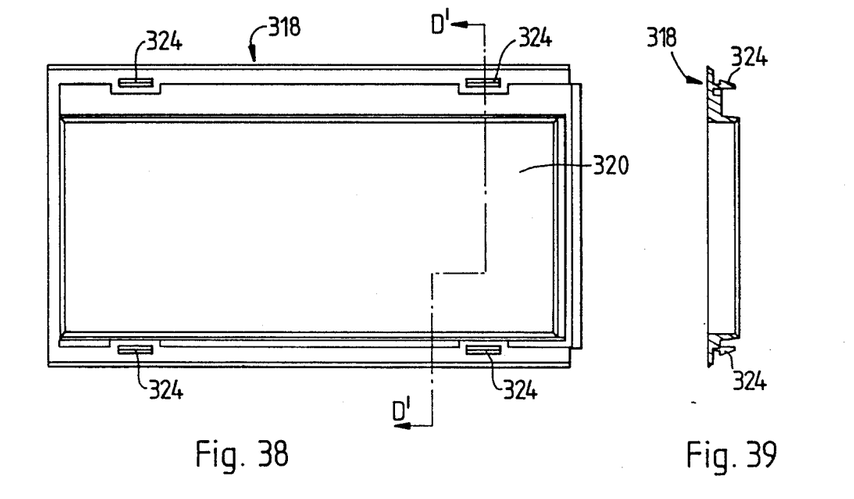
FIG. 38 is a plan view of an escutcheon for installation in the cover member of a consumer unit embodying the invention when the DIN rail adaptor of FIGS. 32 to 37 is in use.
FIG. 39 is a section on line D'—D' of FIG. 38

The spacing of the planar body 302 from the base 12 is chosen such that the fronts of the DIN accessories are positioned in the opening 290 in the cover member 280. Since the accessories have a smaller frontal area than the circuit breakers, a plastics escutcheon 318 (FIGS. 38 and 39) may be snap-fitted into the opening 290 to provide an aperture 320 of the correct dimension D. The cover member is formed with ribs 322 at the periphery of the opening 290 for engagement by teeth 324 moulded integrally with the escutcheon 318.

Figure 31:
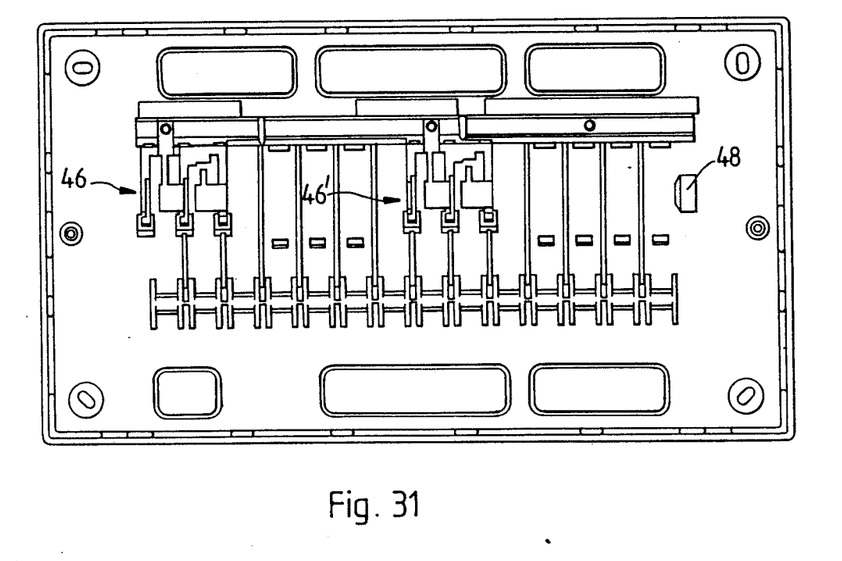
FIG. 31 is a plan view of the baseplate of a second consumer unit embodying the invention.
Figure 32:
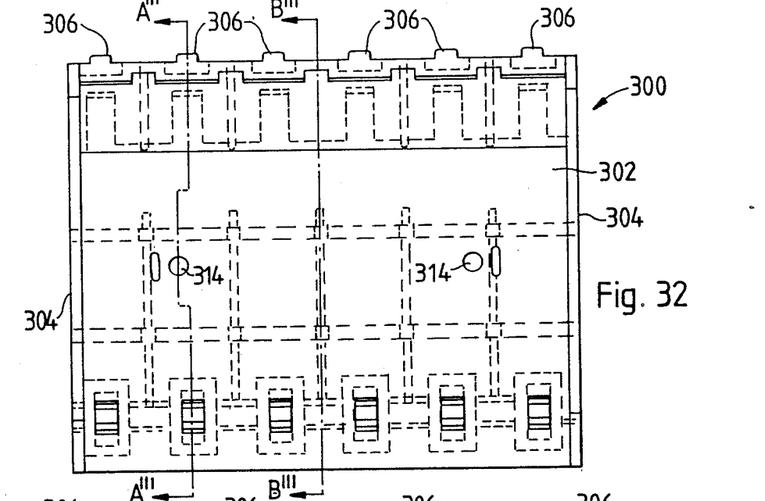
FIGS. 32, 33, 34 and 35 are, respectively, top, bottom front and end views of a DIN rail adaptor embodying part of the invention.
Figure 33:
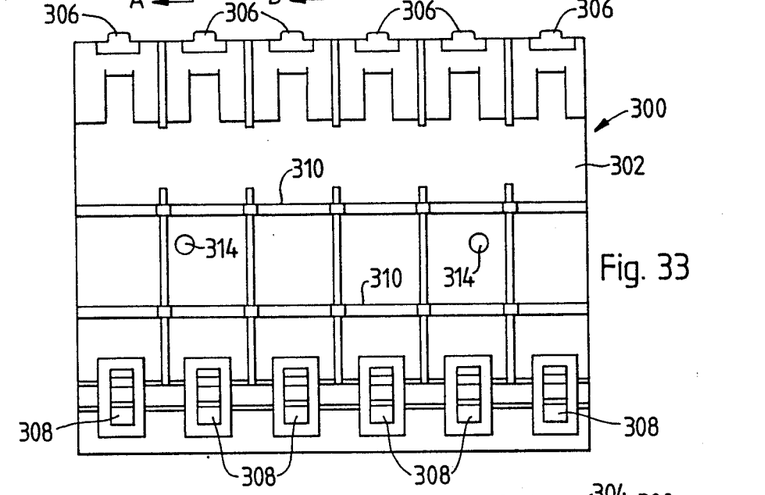
Figure 34:
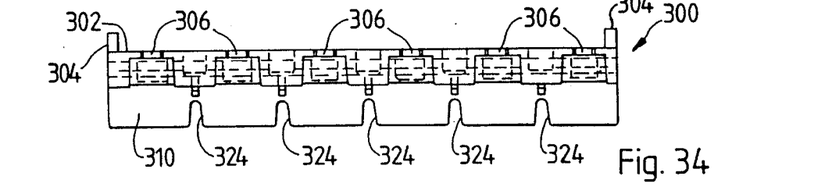

Turning to FIG. 31, there is shown a modified base 12' arranged to support two live busbars. For this purpose, the moulding 46 is duplicated at 46'. One busbar can be mounted between 46 and 46', and the other between 46' and the moulding 48. Clips 108 as described above can be used in both locations to retain the busbars. Other details of this embodiment are similar to the foregoing embodiment, and will therefore not be described in detail. It is contemplated that this double busbar arrangement can be used in two ways:

(i) As a consumer unit for two separate supplies serving separate subcircuits, eg normal tariff and off-peak tariff supplies. In this case each busbar would have a separate supply with separate double-pole switches or circuit breaker mounted on the mouldings 46 and 46'.

(ii) As a consumer unit for a single supply in which a number of subcircuits have common earth-leakage protection. In this case, power is fed from the supply via a double-pole switch at 46, the live supplying the first busbar, which may supply some subcircuits via normal mcb's; however the second busbar is connected to the live supply via a link and an earth-leakage breaker mounted on the second busbar. Thus, earth leakage protection can be provided for a plurality of circuits in a cost-effective manner.

It will be appreciated that whilst the unit previously described with reference to FIGS. 1 to 30 is a six way unit, the features thereof may be incorporated in larger or smaller units, two to eighteen way units being a typical range. Furthermore, the mouldings 46 and 48 for supporting/retaining the busbar 24, the bosses 222 for receiving the circuit breakers, etc may be moulded as independent units for mounting on a separate base. Other modifications and variations will be apparent to those skilled in the art.

I claim:

1. An electrical consumer unit comprising a base member and a cover member which together define a box-shaped enclosure, a live busbar secured to the base member, and means for mounting a plurality of electrical protection devices to the base member at predetermined locations and in electrical connection with the live busbar; characterised by a partition wall upstanding from the base member to extend parallel to the busbar at one side thereof, first locating means on the partition wall adjacent each said location, and second locating means on the base member adjacent each said location at positions parallel to the busbar and on the other side thereof, said first and second locating means being engageable with opposite ends of a laminar cover member to hold the latter across the part of the busbar relating to a respective location when such is not occupied by an electrical protection device.

2. The consumer unit of claim 1, in which said first locating means comprise slots in the partition wall, and said second locating means comprise slots in the base member.

3. The consumer unit of claim 2, including at least one said cover member in the form of a resilient plastics sheet provided at opposed ends with lugs for engagement in said slots.

4. The consumer unit of claim 3, in which one of said lugs engages the slot in the partition wall do so as to be substantially parallel to the base member, and the slot in the base member is oblique, whereby said cover member is tensioned into an arch over the busbar.

5. The consumer unit of claim 3, in which the base member and partition wall comprise an integral plastics moulding.

6. The consumer unit of claim 5, in which said integral moulding is formed to provide ribs separating the electrical protection device locations, and the sides of the resilient plastics sheet are notched to fit snugly around said ribs.

* * * * *